(12) United States Patent
Fitzgerald et al.

(10) Patent No.: US 6,842,810 B1
(45) Date of Patent: Jan. 11, 2005

(54) RESTRICTED ACCESS DEVICES

(75) Inventors: John T. Fitzgerald, Mansfield, MA (US); Alexander Veprinsky, Brookline, MA (US); Philip E. Tamer, Westboro, MA (US); Jonathan I. Krasner, North Attleboro, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 497 days.

(21) Appl. No.: 09/982,492

(22) Filed: Oct. 18, 2001

(51) Int. Cl.[7] .............................................. G06F 13/00
(52) U.S. Cl. ...................................................... 710/240
(58) Field of Search ........................... 710/5, 107, 240, 710/305

(56) References Cited

U.S. PATENT DOCUMENTS

| | | | |
|---|---|---|---|
| 5,206,939 A | 4/1993 | Yanai et al. | |
| 5,381,539 A | 1/1995 | Yanai et al. | |
| 5,592,432 A | 1/1997 | Vishlitzky et al. | |
| 5,819,310 A | 10/1998 | Vishlitzky et al. | |
| 6,101,497 A | 8/2000 | Ofek | |
| 6,321,314 B1 * | 11/2001 | Van Dyke | 711/163 |

* cited by examiner

Primary Examiner—Glenn A. Auve
(74) Attorney, Agent, or Firm—Choate, Hall & Stewart (57) ABSTRACT

Described are techniques in connection with restricting access to devices within a computer system. Access to a device may be restricted to one or more particular hosts within the computer system, and also further restricted to a particular software program executing within the particular hosts. The restricted access device (RAD) may be recognized by one or more hosts only having access to specific portions of the RAD unless special RAD I/O opcodes are used in connection with performing I/O operations. Access to a device may be obtained by enabling a particular use of the special RAD I/O opcodes. Subsequently, access to the same device may be disabled by stopping use of the special RAD I/O opcodes by a particular host and/or software executing in the host. RADs may be used in a variety of applications including, for example, restricting access to shared logs or journals and protecting a database.

42 Claims, 7 Drawing Sheets

RESTRICTED ACCESS DEVICES

BACKGROUND

1. Technical Field

This application generally relates to computer systems, and more particularly to providing selective access to computer system storage devices.

2. Description of Related Art

Computer systems may include different resources that may be used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system. An example of operation and management of a data storage system is the Symmetrix data storage system as described in U.S. Pat. No. 5,819,310, Vishlitzky et al., entitled "Method and Apparatus for Reading Data from Mirrored Logical Volumes on Physical Drives", issued Oct. 6, 1998, which is herein incorporated by reference, U.S. Pat. No. 5,592,432, entitled "Cache Management System Using Time Stamping for Replacement Queue", issued Jan. 7, 1997, Vishlitzky et al., which is herein incorporated by reference, and U.S. Pat. No. 5,381,539, issued on Jan. 10, 1995, entitled "System and Method for Dynamically Controlling Cache Management", Yanai et al., which is herein incorporated by reference, all of which are assigned to EMC Corporation of Hopkinton, Mass.

A host processor may perform a variety of data processing tasks and operations using the data storage system. For example, a host processor may perform basic system I/O operations, such as data read and write operations and also administrative tasks, such as data backup and mirroring operations. When accessing particular devices included in a data storage system, a device may not know what generated a particular access. For example, a device may not be able to distinguish whether a disk access is being performed in connection with a legitimate I/O operation, or in connection with a software virus program attempting to fill-up a disk with data from needless and/or destructive operations. This may cause problems, for example, in that valuable data may be corrupted, lost or inaccessible disrupting operations in a computer system.

An example of remotely accessing devices is described in U.S. Pat. No. 6,101,497 to Ofek, issued Aug. 8, 2000, entitled "Method and Apparatus for Independent and Simultaneous Access to a Common Data Set", which is herein incorporated by reference, and U.S. Pat. No. 5,206,939, issued Apr. 27, 1993, Yanai et al., entitled "System and Method for Disk Mapping and Data Retrieval", which is herein incorporated by reference, both of which are assigned to EMC Corporation of Hopkinton, Mass.

It may be desirable and advantageous to restrict access to particular devices included in a storage system. Additionally, it may be desirable that this technique be efficient and be compatible for use with existing standards.

SUMMARY OF THE INVENTION

In accordance with principles of the invention is a method executed in a computer system for restricting access to a device. A data operation in connection with the device is received. A type of the device is determined as one of restricted access and standard access. It is determined if an opcode associated with the data operation is included in one of a first set of opcodes and a second set of opcodes in which the first set of opcodes specifies standard data operations, and the second set of opcodes specifies restricted data operations. A target location is determined in which the target location is associated with the data operation. In response to determining one of the first and second sets of opcodes, the type and the target location, it is determined if the data operation is valid.

In accordance with another aspect of the invention is a computer program product for restricting access to a device comprising: machine executable code that receives a data operation in connection with the device; machine executable code that determines a type of said device as one of restricted access and standard access; machine executable code that determines if an opcode associated with said data operation is included in one of a first set of opcodes and a second set of opcodes, said first set of opcodes specifying standard data operations, and said second set of opcodes specifying restricted data operations; machine executable code that determines a target location associated with said data operation; and machine executable code that, in response to determining one of said first and said second sets of opcodes, said type, and said target location, determines if said data operation is valid.

In accordance with yet another aspect of the invention is an apparatus for restricting access to a device in a computer system comprising: means for receiving a data operation in connection with the device; means for determining a type of said device as one of restricted access and standard access; means for determining if an opcode associated with said data operation is included in one of a first set of opcodes and a second set of opcodes, said first set of opcodes specifying standard data operations, and said second set of opcodes specifying restricted data operations; means for determining a target location associated with said data operation; and means for determining, in response to said means for determining one of said first and said second sets of opcodes, said type, and said target location, if said data operation is valid.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF PREFERRED EMBODIMENT

Figure 1:
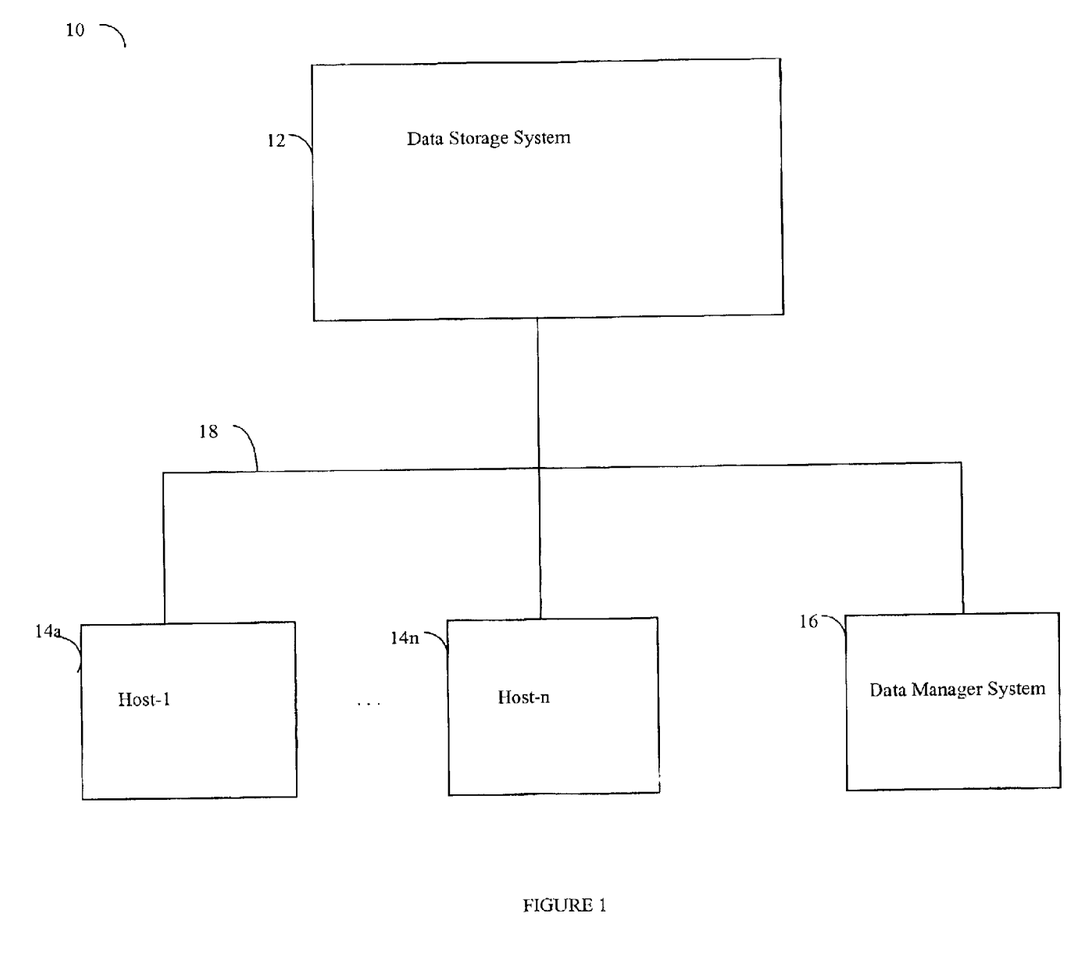
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix™ switch or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue a data request to the data storage system 12 to perform a data operation. For example, an application executing on one of the host computers 14a–14n may perform read and/or write operations for the purpose of performing a backup, mirroring or other administrative operation and may do so while performing data requests to the data storage system 12.

Figure 2:
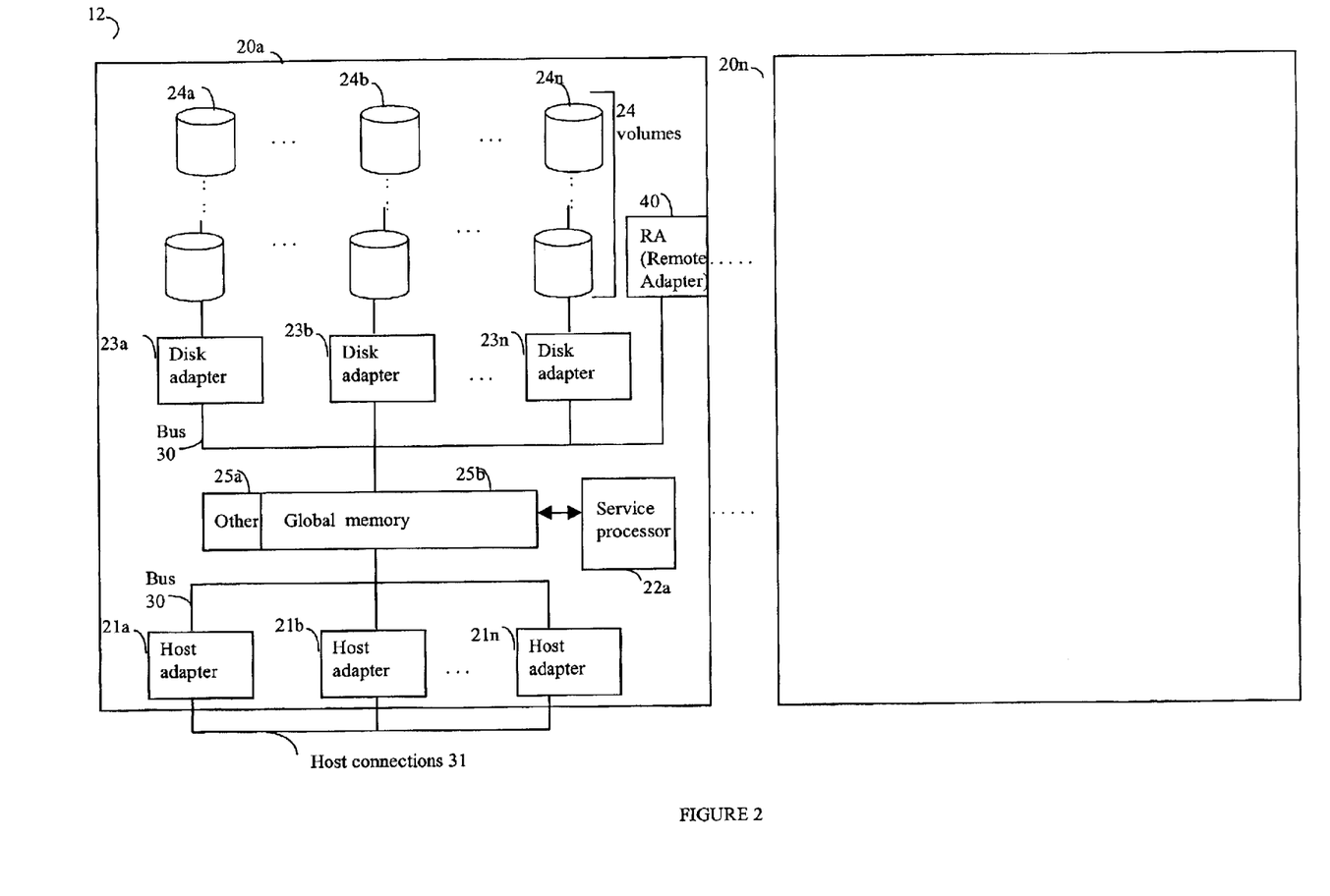
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Mass. In this particular example, each of the Symmetrix™ storage systems 20a–20n may be interconnected (not shown) as well as to the host and data manager systems through any one or more communication connections 31 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a–20n may be resources included in an embodiment of the computer system 10 to provide storage services to, for example, host computer systems and/or the data manager system. The host connections 31 may be communication connections which are external, internal, or a combination thereof, with respect to a storage system.

Each of the Symmetrix™ systems, such as 20a, may include a plurality of disk devices or volumes, such as the arrangement 24 consisting of n rows of disks or volumes 24a–24n. In this arrangement, each row of disks or volumes may be connected to a disk adapter ("DA") or disk director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a–23n are connected, for example, by a bus 30 to a cache that includes a particular portion designated as global memory 25b. The DAs 23a–23n may perform data operations to and from the global memory 25b, for example, in communications with other disk adapters or disk directors, and other components of the system 20a. Generally, the global memory 25b may be used in facilitating communications between components in the system 20a.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a–14n. This performance data may be gathered and stored, for example, in the global memory and/or other storage area.

The system 20a may also include one or more host adapters ("HAs") or directors 21a–21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used, for example, with the Remote Data Facility (RDF) product provided by EMC Corporation of Hopkinton, Mass., or other remote adapter products as may be supplied by other vendors and distributors.

Host systems provide data and access control information through channels to the storage systems, and the storage systems may also provide data to the host systems also through the channels 31. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix™ data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests and related I/O operations for multiple LVs that may reside on a disk.

Within a computer system such as the computer system of FIG. 1, it may be desired to protect access to particular devices. In other words, there may be a need to restrict access to a particular one or more devices, for example, when performing a write operation. These restricted access devices ("RADs") may be characterized in that read and/or write operations in connection with the device are restricted to those computers, for example, having a special "key" allowing access.

It should be noted that certain types of "keys" may not be preferred. For example, an embodiment may include a particular password as the key to obtaining access to a particular device. However, use of a password may not be desirable, for example, in that additional storage may be required in connection with storing and using a password. Additionally, a particular interface, such as an application programming interface ("API"), used in communicating with a particular device may not support using a password as a parameter, for example, as there may be no corresponding parameter provided for in the API for the password. An embodiment may also utilize a key and encryption techniques in connection with RADs. However, there may be no storage space for the key in a particular interface and the particular encryption techniques may vary in accordance with embodiment providing for non-uniform usage and incompatibility among different embodiments.

What will now be described are techniques that may be used in connection with RADs that are compatible with existing standards, such as the Small Computer System Interface (SCSI) standard. It should be noted that although aspects of the following description included herein may make particular reference to the SCSI standard and compatibility, techniques described herein should not be construed as being limited to such embodiments.

In one embodiment, a RAD device may be "recognized" as a device within a computer system by a host even though the host may not be able to perform read and/or write operations in connection with this RAD to all portions of the device. For example, as described in more detail elsewhere herein, a host may only be able to access a first portion of the device and a last portion of the device in which the first portion size is at least 32 kilobytes and the last portion size is at least 1 megabyte. When a host computer system boots or starts up, certain communications may take place between the host and devices, including RADs, which are available and/or connected to the host. The host may recognize a RAD by performing a series of start-up commands, such as, for example, a three command sequence "test-unit-ready/read capacity/inquiry" command sequence. In this example, the host sends a "test-unit-ready" signal to devices in the system and may perform handshaking with the devices in order to recognize each device. Information may be read from the devices, such as in connection with the "read capacity" and "inquiry" commands. The "inquiry" command may return information included in a device record, such as indicating whether a device is a RAD device by a bit value in the device record. A more detailed description of a device record is set forth in following paragraphs.

It should be noted that a system may have a device record corresponding to each particular device within the system. The device record may include device specific information, such as device characteristics in addition to the RAD bit value. It should also be noted that a value may be specified for the RAD bit in a configuration file. The value in the configuration file may be changed accordingly to specify whether a particular device is a RAD in accordance with a particular system configuration and usage of particular devices. An embodiment may provide for manual and/or automated update of the RAD bit value and others included in a configuration file. The configuration file may be read at one or more times in an embodiment, for example, in connection with a device being powered-on or brought on-line, and the like.

A particular embodiment may include the configuration file in the HA or other adapter of the system. For example, an embodiment may use a SCSI adapter (SA) or fibre adapter (FA) rather than an HA in communications with a host. A copy of a configuration file may be stored within the HA, SA, or FA as may be included in an embodiment, for example, to minimize bus traffic within the data storage system 12. However, an embodiment may also store and read the configuration file from elsewhere, such as global memory within the data storage system 12. The particular location(s) of the configuration file may vary in accordance with each embodiment.

In one embodiment, if a device is a RAD, a host may be able to read and write using the standard SCSI commands to first and last portions of the device. In one embodiment, the size of the first portion may be at least 32 kilobytes and the size of the last portion may be at least 1 megabyte. The only way a host is able to access any other portion of the device is by using special I/O commands used to implement RAD read and/or RAD write operations to the device. By providing this access and other commands described elsewhere herein, the device is not "hidden" or "unrecognized" by a host. Rather the host may recognize a RAD, but have restricted access to the RAD.

Figure 3:
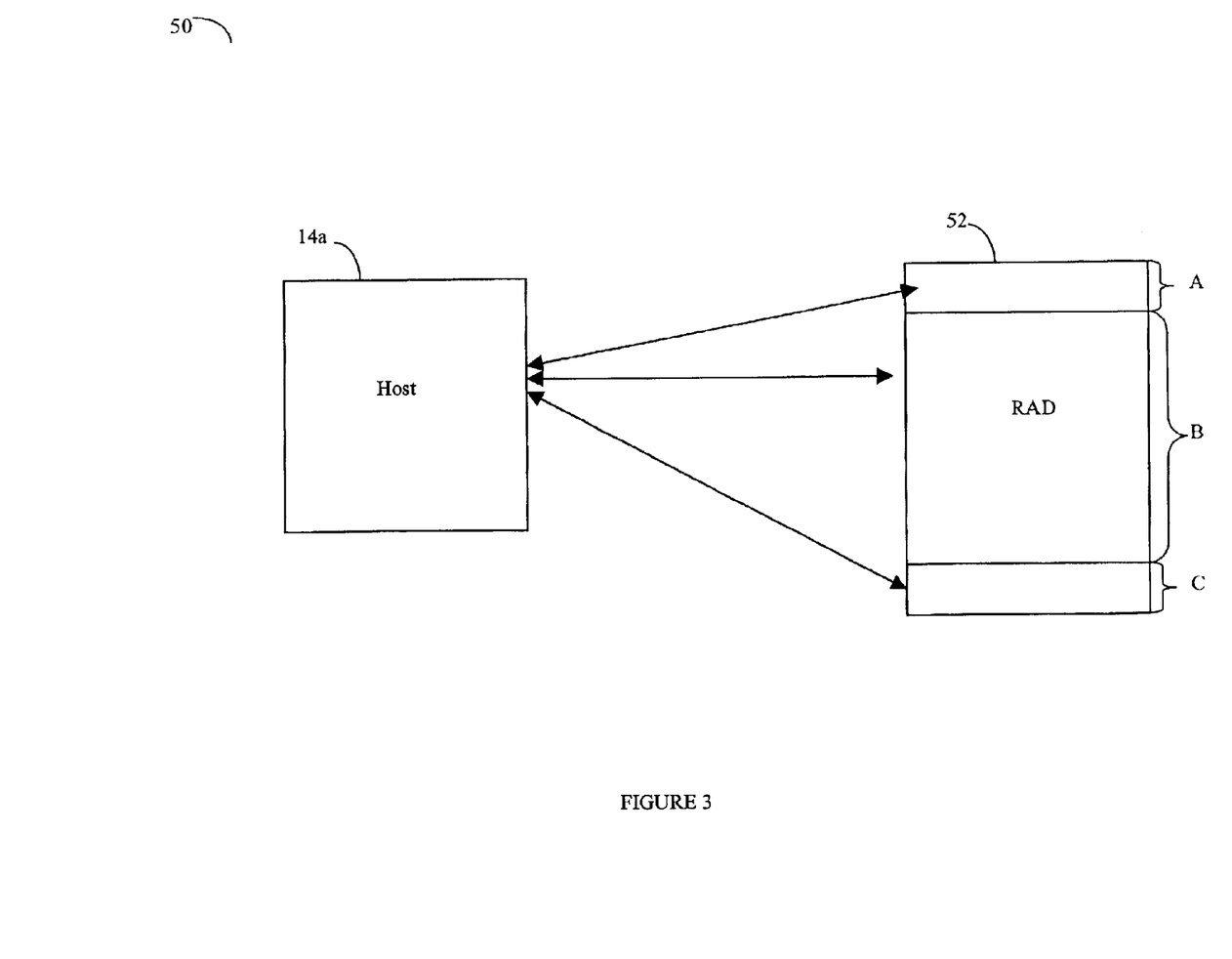
FIG. 3 is an example of an embodiment of a host accessing a restricted access device (RAD)

Referring now to FIG. 3, shown is an example of an embodiment of a host accessing a RAD. In the example 50, the host 14a recognizes the RAD 52 upon completion of booting the host 14a. As part of the boot process of the host, the host may place its "signature" information identifying this particular host in the first and/or last tracks of the RAD. The signature information enables the host to recognize its devices, including a RAD and other physical and/or logical devices, by subsequently reading the "signature" information back, for example, in connection with performing mount system commands to mount the RAD or other physical and/or logical device subsequent to booting the host. In the example 50, the host may have access to the first track (portion A) and the last track (portion C). The only way in which a host may access other portions of the device (portion B) is by using special read and/or write commands for RADs. In other words, as described elsewhere herein in more detail, the host 14a may access RAD 52 portion B only when using special I/O commands, such as a special RAD read and special RAD write command.

It should be noted that other embodiments may use other techniques to enable a host to "recognize" a device besides as described herein. The particular technique may vary with hardware and/or software of each embodiment.

In one embodiment, these special read and/or write commands may be additional opcodes used in connection with performing device I/O operations. In particular, an embodiment may use SCSI commands in connection with performing device I/O operations. In performing a SCSI read command, a particular opcode, such as 0x28 may be specified. Similarly when a host performs a write operation using a SCSI write command, an opcode, such as 0x2A, may be specified. In connection with performing a read operation accessing data on a restricted portion of a RAD, a special read opcode must be used. Similarly, in connection with performing a write operation to a restricted portion of a RAD, a special write opcode must be used. These special read and write opcodes may be used by a host in connection with performing RAD read and RAD write operations to a RAD rather than the standard read and write opcodes, such as 0x28 and 0x2A respectively, that may be specified in accordance with a particular standard, such as the SCSI standard. For example, in one embodiment the RAD read opcode is 0x46 and the RAD write opcode is 0x47. The particular values selected to correspond to the special RAD opcodes may be specified in accordance with particular values of the SCSI standard that are "reserved" or "vendor specific". When a host uses these special RAD opcodes in connection with performing operations to a RAD device, the host may access particular portions of the RAD, such as portion B of FIG. 3. Otherwise, the host is unable to access these restricted portions of the RAD since the device rejects the standard read and write commands.

The foregoing techniques use a special set of opcodes for performing I/O operations which differ from those opcodes used in connection with performing I/O operations to non-RAD devices. It should be noted that other opcodes and values may be used in connection with other embodiments and standards.

In one embodiment, the opcodes used in connection with I/O operations may be included in a table. An opcode not included in the table may be "invalid" and not recognized. This table may be stored in memory, for example, and used by machine executable code performing processing steps of I/O operations.

Figure 4:
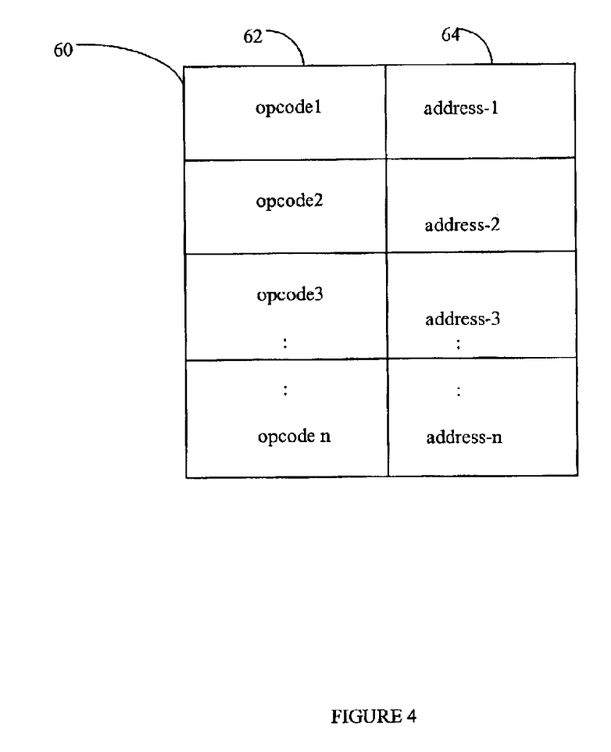
FIG. 4 is an example of a representation of an opcode table that may be used in connection with performing I/O operations within the computer system of FIG. 1.

Referring now to FIG. 4, shown is an example of a representation of an opcode table 60. The opcode table 60 includes an opcode number in the first left hand column 62 and a corresponding routine address in the right hand column 64. When an HA, for example, receives an I/O operation to be processed, it may lookup the I/O opcode in the table 60. When an opcode is located within the table 60, control may be transferred to an "action" at a corresponding address using information in column 64 to execute instructions associated with opcode-specific processing. For example, the value of column 64 may be an address or pointer to a start location at which to begin execution. It should be noted that an embodiment may use any one of a variety of transfer techniques in connection with transferring control to a particular location denoted in column 64. Similarly, an embodiment may use any one of a variety of different techniques in locating a particular row in the table 60 that corresponds to a particular opcode.

Figure 5:
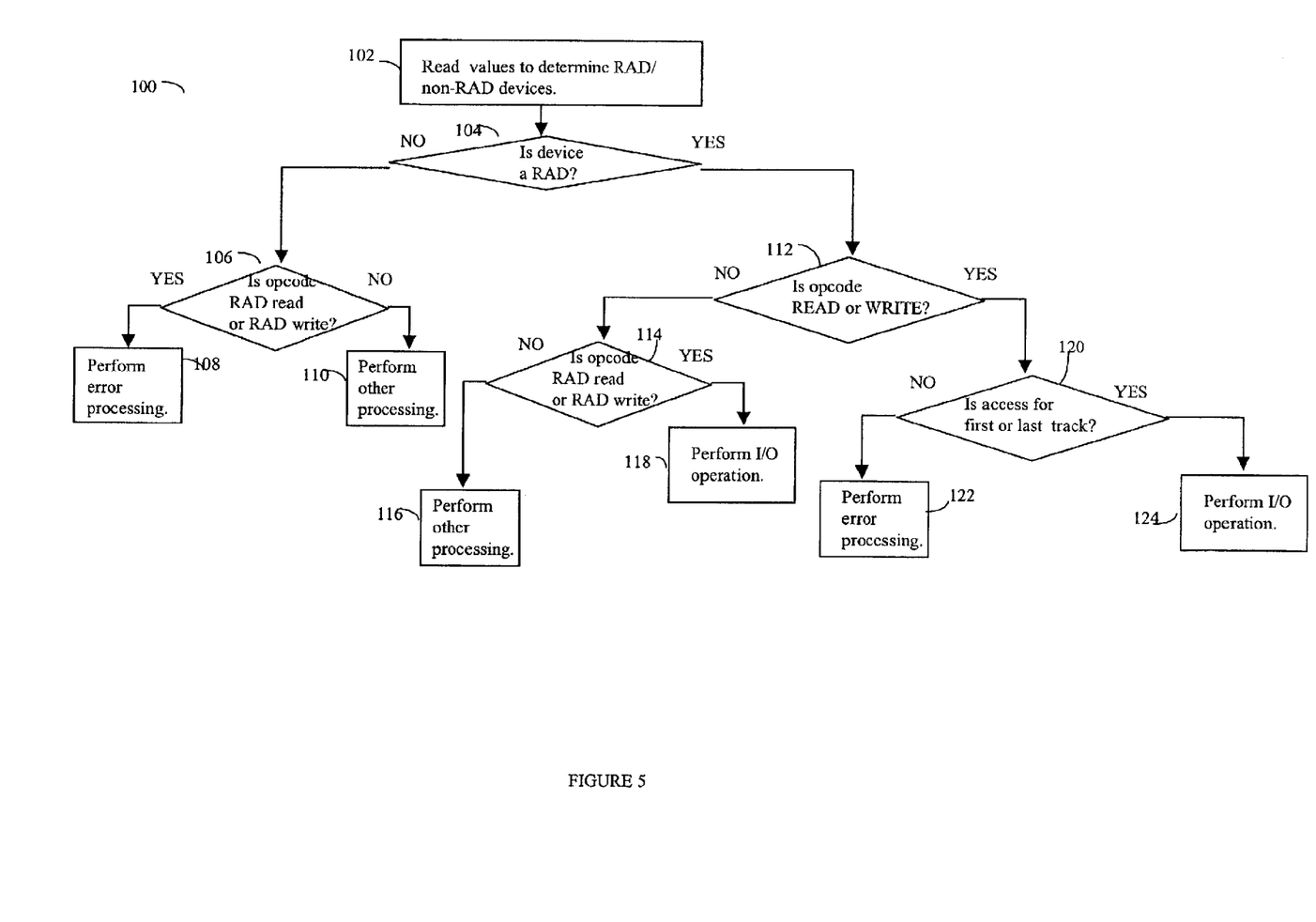
FIG. 5 is flowchart of steps of an embodiment for performing processing steps for I/O operations including a read and write operations of a RAD.

Referring now to FIG. 5, shown is a flowchart of steps of one embodiment for performing opcode processing. Instructions associated with processing steps of FIG. 5 may be included in machine executable code, such as microcode of the HA, SA, or FA, for example, when an I/O operation is requested or sent by a host. The opcode table described in connection with FIG. 4 may be used by the machine executable code performing the processing steps of flowchart 100 of FIG. 5. It should be noted that other embodiments may include equivalent variations of the logic embodied in the flowchart 100 of FIG. 5 rather than the particular ordering and determinations specified herein.

At step 102, values may be read to determine which devices are RAD or non-RAD devices. This information may be read, for example, from a configuration file or other location that may vary in accordance with each embodiment. At step 104, a determination is made as to whether a particular device is a RAD in accordance with the information from step 102 and the particular device being accessed in connection with the I/O request being processed. If a determination is made at step 104 that the device is not a RAD device, control proceeds to step 106 where a determination is made as to whether the opcode is a RAD read or RAD write opcode. If so, control proceeds to step 108 to perform error processing in connection with issuing a RAD I/O operation for a non-RAD device. If it is determined at step 106 that the opcode is not a RAD read or RAD write opcode, control proceeds to step 110 where other processing may be performed in accordance with the particular I/O operation.

If it is determined at step 104 that the device is a RAD, control proceeds to step 112 where a determination is made as to whether the opcode is a read or write I/O operation. If it is determined at step 112 that the opcode does not correspond to a "standard" or non-RAD read or write operation, control proceeds to step 114 where a determination is made as to whether the opcode corresponds to a RAD read or RAD write opcode. If it is determined that the opcode specifies a RAD read or RAD write, control proceeds to steps 118 to perform the I/O operation. Otherwise, control proceeds to step 116 where other processing is performed.

If it is determined at step 112 that the opcode corresponds to "standard" or non-RAD read or write operation in connection with a RAD, control proceeds to step 120 where a determination is made as to whether the read or write is for the first or last track of the device. If a determination is made at step 120 that the read or write operation is not for the first or last track of the RAD, control proceeds to step 122 where error processing is performed. Otherwise, if a determination is made that the read or write operation of the RAD is to the first or last track, the I/O operation is performed at step 124. The processing of step 124 may be performed, for example, in connection with booting a host computer system placing its "signature" information on a device to enable a host to recognize the RAD.

It should be noted that in the foregoing flowchart, if an I/O operation to a RAD device is for a regular non-RAD read or write operation, only accesses to the first and last track are serviced. All other accesses result in an error. If an I/O operation to a non-RAD device uses a RAD I/O opcode, an error results. RAD I/O opcodes are only valid in connection with RAD devices.

What will now be described are example applications in which a RAD may be used.

Figure 6:
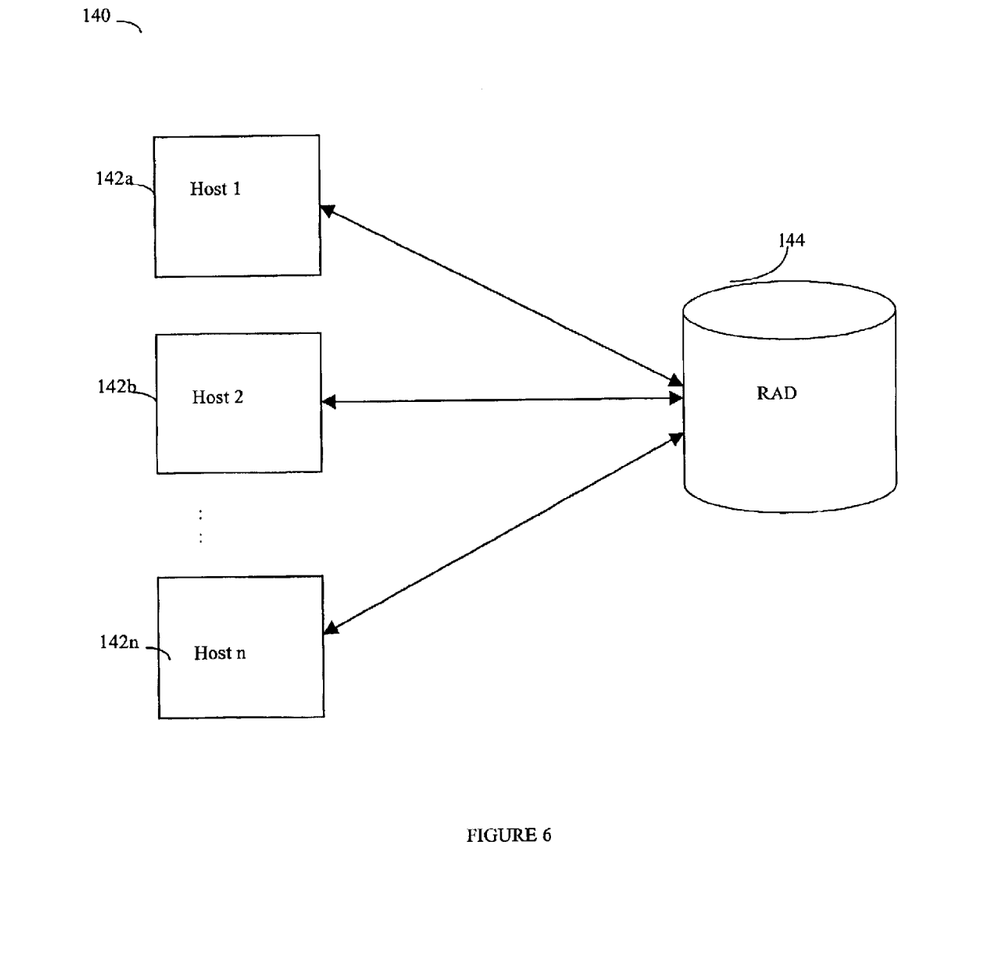
FIG. 6 is an example of an embodiment illustrating use of a RAD accessible by a plurality of hosts.

Referring now to FIG. 6, shown is an example of an illustration 140 in which multiple hosts 142a–142n may access a RAD 144. Each of the hosts may record information, such as in connection with recording information to a transaction log file stored on the RAD. Each host may access the RAD but only one at a time as there may not be multiple writers to the same log file in this example. This mutual writer access to the log file may be implemented using any one or more of a variety of different techniques, such as semaphores and the like, that may be included in a particular embodiment. The particular technique and tools used in implementing may vary in accordance with the hardware and/or software of an embodiment.

Each host may be enabled to perform I/O operations to the RAD. In one embodiment, a host may be "enabled" by using the RAD form of an I/O command rather than an equivalent non-RAD form of an I/O command as may be included in an application programming interface (API). In one embodiment, software for performing one or more APIs ("API software") may be included on a host. The API software may be configured to use either a non-RAD I/O opcode or a RAD I/O opcode. For example, API software on a first host may be configured to use a RAD write opcode to a first device and a non-RAD write opcode to a second device. When the first host performs a write operation to the first device, the RAD write opcode is used. When the first host performs a write operation to the second device, the non-RAD write opcode is used. An embodiment may also include software such that the API may be modified in accordance with changes in device configuration for each host. If the devices are later reconfigured such that the first device is now a non-RAD device, write operations to the first device now use a non-RAD opcode with the API when performing a write operation to the first device.

The special RAD I/O operations and opcodes may be used in connection with replaying the log, for example, in connection with performing data recovery operations in a clustered file system. When a particular host is reading the log file of the RAD, the particular host may use the special RAD I/O commands while executing software for data recovery. All other hosts may be enabled to only use the regular read and write I/O operations for the RAD.

Figure 7:
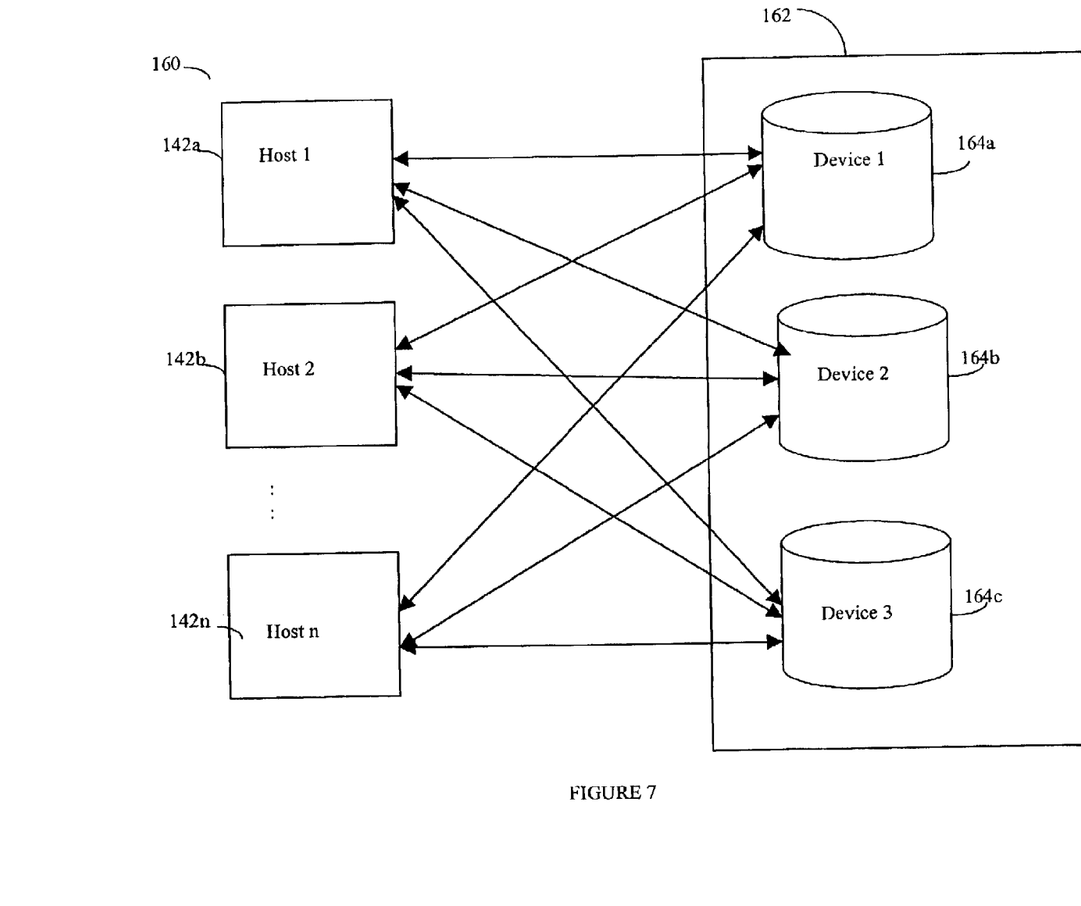
FIG. 7 is another example of an embodiment illustrating use of a plurality of RADs recognized by a plurality of hosts.

Referring now to FIG. 7, shown is an example of an embodiment 160 illustrating another use of a RAD. In the configuration 160, each of the host systems 142a–142n recognizes all devices Device 1 164a, Device 2 164b, and Device 3 164c included in the data storage 162. The data storage 162 may be, for example, a Symmetrix storage system that includes a plurality of storage devices. Stored on Device 2 is a database. Only a host having a particular database software package is allowed to access the database and only while performing I/O operations in connection with executing this database software package. Thus, the particular database software package may be installed and execute on any one or more of the hosts 142a–142n and may access the RAD when executing the database software package. The database software package may be enabled to access the device by using the special RAD I/O read and write commands. Otherwise, the regular read and write I/O commands may be used restricting access to the database of Device 2 which is indicated as a RAD. In this instance, the database does not restrict access to particular hosts as it may accept read and writes from any host. Thus, the RAD may be used in connection with restricting access to the database of Device 2 using the special RAD I/O opcodes. The database may have restricted access in accordance with particular hosts. Further, access to the database may be restricted to only specified software executing on a host. The database may be, for example, an API database that may be modified by special software executing on any one or more of the hosts.

An embodiment may also include software, such as Powerpath™ software by EMC Corporation of Hopkinton, Mass. that executes on each host to provide for distribution and load balancing of I/O requests over multiple ports. Thus, each host may have multiple ports by which to connect to a single RAD. One or more of the ports may be enabled to send RAD I/O operations to a RAD using the RAD I/O opcodes.

The foregoing provides a flexible and efficient way of restricting access to particular devices. The foregoing may be used in connection with standard-compliant implementations providing restricted device functionality.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for restricting access to a device comprising:

receiving a data operation in connection with the device;

determining a type of said device as one of restricted access and standard access;

determining if an opcode associated with said data operation is included in one of a first set of opcodes and a second set of opcodes, said first set of opcodes specifying standard data operations, and said second set of opcodes specifying restricted data operations;

determining a target location associated with said data operation; and in response to determining one of said first and said second sets of opcodes, said type, and said target location, determining if said data operation is valid in accordance with said type and which of said sets of opcodes includes said opcode.

2. The method of claim 1, further comprising:

recognizing a device which is of type restricted access by all hosts included in the computer system.

3. The method of claim 2, further comprising:

restricting access to a recognized device to a particular host in the computer system by having said particular host perform data operations to said recognized device using opcodes included in said second set.

4. The method of claim 3, wherein only a specific software program executing on the particular host in the computer system is able to access said recognized device by performing data operations using opcodes included in said second set.

5. The method of claim 4, further comprising:

changing a status associated with a recognized device between restricted and standard.

6. The method of claim 5, further comprising:

using a configuration file and value included therein to specify said status.

7. The method of claim 4, further comprising:

performing a data operation to said recognized device that includes a file that is accessible by a plurality of hosts, a first of said plurality of hosts having exclusive access to said file by performing data operations in connection with said recognized device using opcodes included in said second set.

8. The method of claim 1, further comprising:

installing an application programming interface on a host included in said computer system performing said data operation; and using said application programming interface to issue said data operation.

9. The method of claim 8, further comprising:

configuring said application programming interface in accordance with a device configuring associated with said host wherein said device configuration includes said host accessing at least one device as a restricted access device.

10. A method for restricting access to a device comprising:

receiving a data operation in connection with the device;

determining a type of said device as one of restricted access and standard access;

determining if an opcode associated with said data operation is included in one of a first set of opcodes and a second set of opcodes, said first set of opcodes specifying standard data operations, and said second set of opcodes specifying restricted data operations;

determining a target location associated with said data operation;

in response to determining one of said first and said second sets of opcodes, said type, and said target location, determining if said data operation is valid; and determining that said data operation is valid if said opcode is included in said second set and said type is restricted.

11. The method of claim 10, further comprising:

determining that said data operation is valid if said opcode is included in said first set and said type is standard.

12. The method of claim 11, further comprising:

determining that said data operation is valid in response to determining that said opcode is included in said first set, said type is restricted and said location is one of standard access on said device.

13. The method of claim 12, further comprising:

performing said data operation in response to determining that said data operation is valid and otherwise performing error processing.

14. The method of claim 13, wherein each of said first and second sets of opcodes includes a read opcode and a write opcode, each of the opcodes included in said first set being different from each of said opcodes included in said second set.

15. A computer program product stored on a computer-readable medium for restricting access to a device comprising:

machine executable code that receives a data operation in connection with the device;

machine executable code that determines a type of said device as one of restricted access and standard access;

machine executable code that determines if an opcode associated with said data operation is included in one of a first set of opcodes and a second set of opcodes, said first set of opcodes specifying standard data operations, and said second set of opcodes specifying restricted data operations;

machine executable code that determines a target location associated with said data operation; and machine executable code that, in response to determining one of said first and said second sets of opcodes, said type, and said target location, determines if said data operation is valid in accordance with said type and which of said sets of opcodes includes said opcode.

16. The computer program product of claim 15, further comprising:

machine executable code that determines that said data operation is valid if said opcode is included in said second set and said type is restricted.

17. The computer program product of claim 16, further comprising:

machine executable code that determines that said data operation is valid if said opcode is included in said first set and said type is standard.

18. The computer program product of claim 17, further comprising:

machine executable code that determines that said data operation is valid in response to determining that said opcode is included in said first set, said type is restricted and said location is one of standard access on said device.

19. The computer program product of claim 18, further comprising:

machine executable code that performs said data operation in response to determining that said data operation is valid and otherwise performing error processing.

20. The computer program product of claim 19, wherein each of said first and second sets of opcodes includes a read opcode and a write opcode, each of the opcodes included in said first set being different from each of said opcodes included in said second set.

21. The computer program product of claim 15, further comprising:

machine executable code that recognizes a device which is of type restricted access by all hosts included in the computer system.

22. The machine executable code of claim 21, further comprising:

machine executable code that restricts access to a recognized device to a particular host in the computer system by having said particular host perform data operations to said recognized device using opcodes included in said second set.

23. The computer program product of claim 22, wherein only a specific software program executing on the particular host in the computer system is able to access said recognized device by performing data operations using opcodes included in said second set.

24. The computer program product of claim 23, further comprising:

machine executable code that changes a status associated with a recognized device between restricted and standard.

25. The computer program product of claim 24, further comprising:

machine executable code that uses a configuration file and value included therein to specify said status.

26. The computer program product of claim 23, further comprising:

machine executable code that performs a data operation to said recognized device that includes a file that is accessible by a plurality of hosts, a first of said plurality of hosts having exclusive access to said file by performing data operations in connection with said recognized device using opcodes included in said second set.

27. The computer program product of claim 15, further comprising:

machine executable code that installs an application programming interface on a host included in said computer system performing said data operation; and machine executable code that uses said application programming interface to issue said data operation.

28. The computer program product of claim 27, further comprising:

machine executable code that configures said application programming interface in accordance with a device configuration associated with said host wherein said device configuration includes said host accessing at least one device as a restricted access device.

29. An apparatus for restricting access to a device in a computer system comprising:

means for receiving a data operation in connection with the device;

means for determining a type of said device as one of restricted access and standard access;

means for determining if an opcode associated with said data operation is included in one of a first set of opcodes and a second set of opcodes, said first set of opcodes specifying standard data operations, and said second set of opcodes specifying restricted data operations;

means for determining a target location associated with said data operation; and means for determining, in response to said means for determining one of said first and said second sets of opcodes, said type, and said target location, if said data operation is valid in accordance with said type and which of said sets of opcodes includes said opcode.

30. The apparatus of claim 29, further comprising:

means for recognizing a device which is of type restricted access by all hosts included in the computer system.

31. The apparatus of claim 30, further comprising:

means for restricting access to a recognized device to a particular host in the computer system by having said particular host perform data operations to said recognized device using opcodes included in said second set.

32. The apparatus of claim 31, wherein only a specific software program executing on the particular host in the computer system is able to access said recognized device by performing data operations using opcodes included in said second set.

33. The apparatus of claim 32, further comprising:

means for changing a status associated with a recognized device between restricted and standard.

34. The apparatus of claim 33, further comprising:

means for using a configuration file and value included therein to specify said status.

35. The apparatus of claim 32, further comprising:

means for performing a data operation to said recognized device that includes a file that is accessible by a plurality of hosts, a first of said plurality of hosts having exclusive access to said file by performing data operations in connection with said recognized device using opcodes included in said second set.

36. The apparatus of claim 29, further comprising:

means for installing an application programming interface on a host included in said computer system performing said data operation; and means for using said application programming interface to issue said data operation.

37. The apparatus of claim 36, further comprising:

means for configuring said application programming interface in accordance with a device configuration associated with said host wherein said device configuration includes said host accessing at least one device as a restricted access device.

38. An apparatus for restricting access to a device in a computer system comprising:

means for receiving a data operation in connection with the device;

means for determining a type of said device as one of restricted access and standard access;

means for determining if an opcode associated with said data operation is included in one of a first set of opcodes and a second set of opcodes, said first set of opcodes specifying standard data operations, and said second set of opcodes specifying restricted data operations;

means for determining a target location associated with said data operation;

means for determining, in response to said means for determining one of said first and said second sets of opcodes, said type, and said target location, if said data operation is valid; and means for determining that said data operation is valid if said opcode is included in said second set and said type is restricted.

39. The apparatus of claim 38, further comprising:

means for determining that said data operation is valid if said opcode is included in said first set and said type is standard.

40. The apparatus of claim 39, further comprising:

means for determining that said data operation is valid in response to determining that said opcode is included in said first set, said type is restricted and said location is one of standard access on said device.

41. The apparatus of claim 40, further comprising:

means for performing said data operation in response to determining that said data operation is valid and otherwise performing error processing.

42. The apparatus of claim 41, wherein each of said first and second sets of opcodes includes a read opcode and a write opcode, each of the opcodes included in said first set being different from each of said opcodes included in said second set.

* * * * *